Dec. 29, 1931.  G. F. HANDLEY  1,839,150
TYPEWRITING MACHINE
Filed Oct. 10, 1927

Inventor
G. F. Handley
by his Attorneys

Patented Dec. 29, 1931

1,839,150

UNITED STATES PATENT OFFICE

GEORGE F. HANDLEY, OF GLENDALE, NEW YORK, ASSIGNOR TO ROYAL TYPEWRITER COMPANY, INC., OF NEW YORK, N. Y., A CORPORATION OF NEW YORK

TYPEWRITING MACHINE

Application filed October 10, 1927. Serial No. 225,231.

This invention relates to a shiftable type segment and to the manner in which the segment is mounted for accurate shifting movement. Both the segment and the adjacent frame are provided with ball races in which are mounted ball bearings, and the details of the invention consist in the manner in which the ball races are attached to the segment and the machine frame, and provisions for necessary adjustment thereof.

Figures 1, 2:
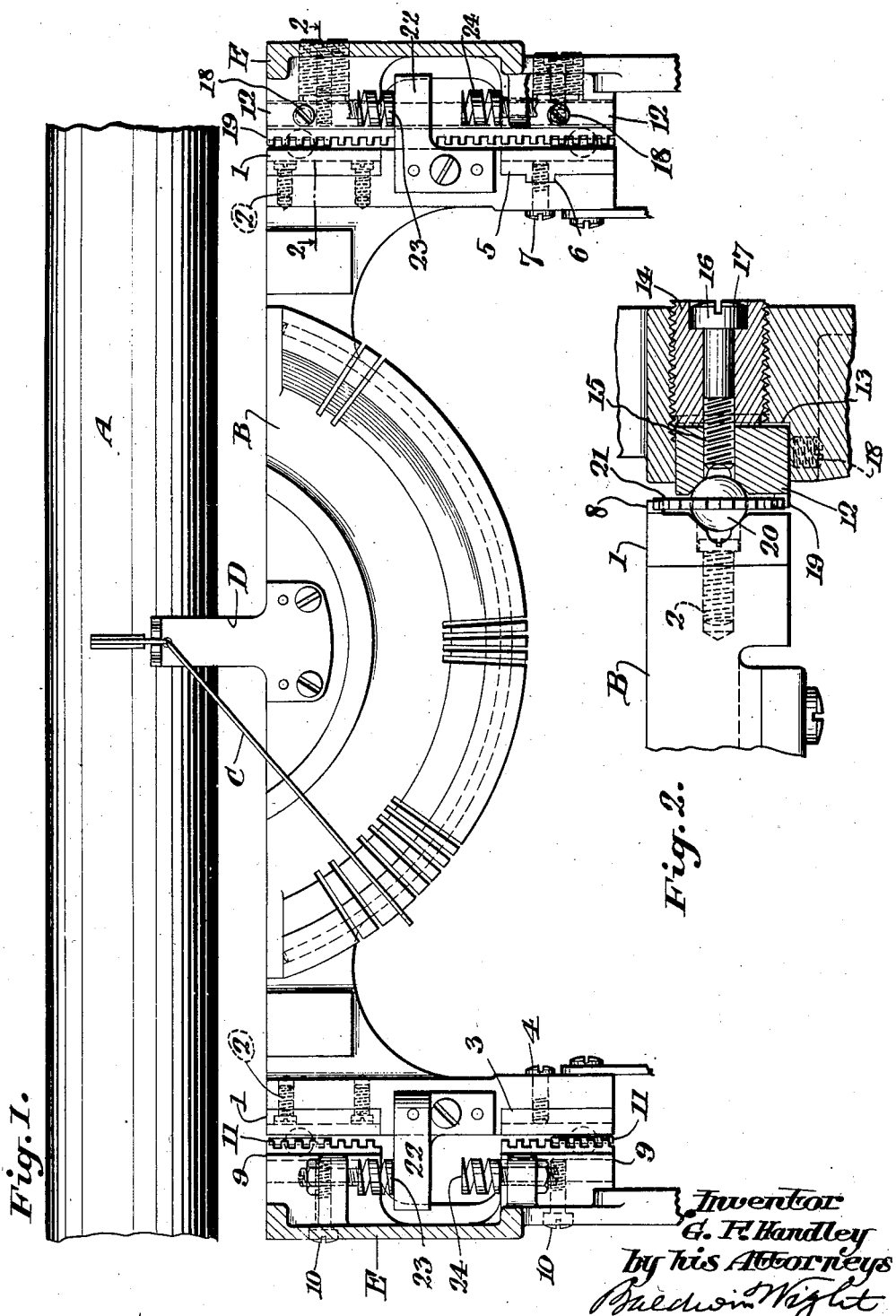
Figure 1 shows a vertical transverse section through the machine, with parts in elevation.
Figure 2 is a section on the line 2—2 of Figure 1.

There is illustrated in the present application only so much of a typewriting machine as is necessary for a disclosure of the invention. There is shown a platen A, type segment B, type bar C, type guide D, and a portion E of the machine frame. These parts may be of any old or desired construction, so far as the present invention is concerned.

Each side of the type segment is provided at the upper part thereof with a ball race 1 in the form of a grooved member which fits into a cut out in the segment, and is held in position by screws 2 which pass through the bottom of the V-shaped grooves of the ball race.

The lower part of the segment on one side of the machine is provided with a ball race 3 which fits into a cutout in the segment, and is held in position by a screw 4 which passes through the depending leg of the segment and screw threads into the ball race. At the other side of the machine the corresponding ball race 5 has a rib 6 which fits in a groove in the segment, and a screw 7 passes through an elongated slot and threads into the ball race 5, thus permitting slight transverse adjustment of the ball race relative to the segment, if found necessary or desirable. The ball races 1, 3, and 5 are provided at one edge with rack teeth 8.

At one side of the machine there are carried by the machine frame upper and lower ball races 9, opposite the ball races 1 and 3, which are positioned in vertical grooves in the frame of the machine and held in position by screws 10, which pass through the outside of the machine and are screw threaded into the race members. These race members 9 are provided with rack teeth 11 which are positioned on the edge of the ball races at the side distant from the rack teeth 8.

At the other side of the machine a ball race 12 is positioned on the machine frame opposite the ball races 1 and 5. This ball race is shown as a single race member, although two separate members may be provided if desired. The race fits within a vertical groove 13 in the side of the machine frame, which groove is slightly larger in its fore and aft dimensions than the ball race. This race 12 is held in position by the following means. Upper and lower adjusting screws 14 are threaded into the side of the machine frame, and the inner end of each engages the outer side of the ball race. A binding screw 15 passes through each adjusting screw 14 and at its inner end threads into the ball race. This screw has a head 16 which fits in a depression 17 in the screw 14. It is obvious that by proper adjustment of the screws 14 and 15 the ball race may be positioned and held as desired. There is also provided one or more screws 18 which engage one side of the race 12 to force it firmly against the other side of the groove 13 in which it fits. The race member 12 is also provided at one edge with rack teeth 19.

Balls 20 are placed in the raceways, and are surrounded by annular pinions 21 which mesh with both of the racks 8 and 11, or 8 and 19, as the case may be. The segment is provided with the usual stops 22, which are held normally in engagement with upper spring stop members 23, and when the segment is moved downwardly these stops engage similarly lower spring stop members 24.

From the foregoing, it will be apparent that my improved means for mounting the vertically shiftable type segment embodies many advantages. The vertical movement of the segment is decidedly limited and consequently I have provided separate upper and lower races on the left hand side of the machine, as it would be a waste of material and also waste of time in milling a long continuous race, for the reason that all that is required is a raceway spaced apart sufficiently to provide a stable bearing for the balls and sufficiently long to provide for the ball travel equal to the height of the type. This two-part race has a decided advantage in that they are duplicates of each other. This permits a ready renewal at a small cost should either race become pitted or otherwise worn. The long race 12 on the right hand side of the machine is adjustable to provide the proper fit so that the segment may be fitted freely without shake. The two adjusting screws 14 and the two binding screws 15 are provided for effecting the proper adjustment of the race 12. By providing a single race 12, distinguished from the upper and lower races on the left hand side of the machine I have provided a cheaper construction because with the single race it is only necessary to provide two adjusting and two binding screws whereas if the separate races were employed twice the number of screws would be necessary.

By mounting the lower race 5 on the right hand side of the machine for transverse adjustment relative to the segment, permits the four bearings to be perfectly alined so as to insure free movement of the segment.

It is obvious that detailed changes may be made in the precise construction of the parts, without in any way departing from the spirit of the invention, which is to be regarded as limited only by the scope of the appended claims.

I claim as my invention:

1. Means for mounting a vertically shiftable type segment, comprising a main frame, a segment, upper and lower ball races on each side of the segment, upper and lower ball races fixed to the frame on one side thereof for cooperation with the races on one side of the segment, balls disposed intermediate said upper and lower cooperating races, a single ball race mounted on the opposite side of the frame for cooperation with the upper and lower races on the opposite side of the segment, and a single ball disposed between said single race and the cooperating upper race, and a single ball disposed between said single race and the cooperating lower race, and separate upper and lower means on the frame for cooperation with said single ball race to adjust the latter towards and from the segment and to retain said race in an adjusted position, the lower ball race on the segment which cooperates with the single ball race on the frame being mounted for adjustment transversely of the segment.

2. Means for mounting a vertically shiftable type segment, comprising a main frame, a segment, upper and lower ball races on each side of the segment, upper and lower ball races fixed to the frame on one side thereof for cooperation with the ball races on one side of the segment, a single ball race mounted on the frame on the opposite side thereof and cooperating with the ball races on the opposite side of the segment, the lower ball race on the segment which cooperates with the single ball race on the frame being mounted for adjustment transversely of the segment, and separate upper and lower means mounted on the frame for cooperation with said single ball race to adjust the latter towards and from the segment and to retain said race in an adjusted position.

3. Means for mounting a vertically shiftable type segment, comprising a main frame, a segment, upper and lower ball races on each side of the segment, upper and lower ball races fixed to the frame on one side thereof for cooperation with the ball races on one side of the segment, a single ball race mounted on the frame on the opposite side thereof and cooperating with the ball races on the opposite side of the segment, the lower ball race on the segment which cooperates with the single ball race on the frame being mounted for adjustment transversely of the segment, separate upper and lower means mounted on the frame for cooperation with said single ball race to adjust the latter towards and from the segment and to retain said race in an adjusted position, cooperating rack bars fixed to ball races on the segment and frame respectively, balls respectively mounted between the cooperating races, and pinions respectively surrounding the balls for cooperation with said rack bars.

In testimony whereof, I have hereunto subscribed my name.

GEORGE F. HANDLEY.